United States Patent
Luongo et al.

(10) Patent No.: US 6,215,202 B1
(45) Date of Patent: Apr. 10, 2001

(54) SHUNT CONNECTED SUPERCONDUCTING ENERGY MANAGEMENT SYSTEM HAVING A SINGLE SWITCHABLE CONNECTION TO THE GRID

(75) Inventors: Cesar A. Luongo, San Francisco, CA (US); Franz Josef Unterlass, Adelsdorf (DE)

(73) Assignees: Bechtel Enterprises Inc., San Francisco, CA (US); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/083,009

(22) Filed: May 21, 1998

(51) Int. Cl.[7] .................. H02J 3/04; H02J 9/06
(52) U.S. Cl. ........................ 307/64; 307/23
(58) Field of Search ................. 307/43, 44, 64, 307/65, 66, 80, 85, 86, 87, 18, 23; 361/19, 141; 363/14

(56) References Cited

U.S. PATENT DOCUMENTS

| | | |
|---|---|---|
| 4,695,932 | 9/1987 | Higashino . |
| 4,731,547 * | 3/1988 | Alenduff et al. .................. 307/85 |
| 5,146,383 | 9/1992 | Logan . |
| 5,204,548 * | 4/1993 | Dahler et al. .................. 307/66 |
| 5,256,993 | 10/1993 | Walter et al. . |
| 5,329,222 | 7/1994 | Gyugyi et al. . |
| 5,376,828 * | 12/1994 | Kim et al. .................. 307/64 |
| 5,514,915 | 5/1996 | Kim et al. . |
| 5,610,958 | 3/1997 | Shimano et al. . |
| 5,656,870 * | 8/1997 | Turnbull .................. 307/64 |

FOREIGN PATENT DOCUMENTS

WO 88/08218 10/1988 (WO) .
WO 95/24049 9/1995 (WO) .

OTHER PUBLICATIONS

Hassan, I.D. et al., (Jul. 1993) "400 MW SMES power conditioning system development and simulation",*IEEE Transactions on Power Electronics*, 8(3): 237–249.

Skiles J.J. et al.,(Nov. 1996) "Performance of a power conversion system for superconducting magnetic energy storage (SMES)", *IEEE Transactions on Power Systems*, 11(4):1718–1723.

* cited by examiner

*Primary Examiner*—Albert W. Paladini
*Assistant Examiner*—R. Deberadinis n
(74) *Attorney, Agent, or Firm*—Morrison & Foerster, LLP

(57) ABSTRACT

A shunt connected superconducting energy management system (SEMS) is provided at a single switched connection between a utility grid and one or more power sensitive loads such as a semiconductor manufacturing plant having power requirements in the range on the order of 2 megawatts (MW) to 200 MW. When a voltage disturbance is sensed in the grid, power control circuitry acts to simultaneously isolate the load and the SEMS from the grid using a single switch which simultaneously provides full back up power to the load instantaneously without voltage transients or disturbances.

11 Claims, 11 Drawing Sheets

SHUNT CONNECTED SUPERCONDUCTING ENERGY MANAGEMENT SYSTEM HAVING A SINGLE SWITCHABLE CONNECTION TO THE GRID

FIELD OF THE INVENTION

The field of the invention relates generally to the stabilization and control of electric power delivered from a utility grid to a load. In particular, the field of the invention relates to a shunt connected superconducting energy management system (SEMS) providing a single switched connection between a utility grid and one or more power sensitive loads such as a semiconductor manufacturing plant having power requirements in the range on the order of 2 megawatts (MW) to 200 MW. When a voltage disturbance is sensed in the grid, the power control circuitry aspect of the invention simultaneously isolates the load and SEMS from the grid by a single switch which simultaneously provides full back up power to the load instantaneously without voltage transients or disturbances. The provision of instantaneous back up power to one or more large loads without voltage transients was not previously possible with conventional back-up power systems.

BACKGROUND

The role of the power transmission utility industry in providing reliable service is under increasing pressure in today's wholesale power market, which must manage an increasing number of transmission modes, brought upon by deregulation. Power generation outages or transmission line faults several systems away can produce voltage disturbances throughout interconnected power systems. Transmission planning done for individual systems decades ago did not anticipate these changes, nor the higher power quality standards that would be required by today's critical manufacturing processes, such as for example, semiconductor and integrated circuit fabrication. From a utility company's perspective, the degree of reliability of power must be "good enough" for the general public, and added enhancements for a particular industry face difficulty obtaining regulatory approval if the costs are to be borne by other electric customers.

Deregulation of the Utility Industry and increased sharing of existing utility grid networks are expected to result in a further decline in the quality of electric power available for industrial consumers. In a deregulated environment utilities will begin to minimize investment and maintenance expenditures and therefore the grid infrastructure will become older and less reliable, thereby decreasing power quality. Momentary sags and power interruptions cause at least $26 billion in downtime in terms of productivity in the United States alone. Lost revenue due to power quality problems for a typical 200 millimeter wafer semiconductor manufacturing factory in the United States is estimated to be in the range of $20–$50 million per year per plant.

Exacerbating the problem are the variety of entities involved in supporting semiconductor manufacturing, none of whom take full responsibility for ownership of the power quality problem. The industry trend is toward higher performing equipment within plants which may typically lead to greater sensitivity to a voltage disturbance. Existing solutions for distributed power quality within a plant, such as a conventional uninterruptable power supplies (UPS), often create unacceptable harmonic distortions in power, thereby increasing instability and leaving gaps in protection that are discovered piecemeal as particular plant or grid operating scenarios are developed.

There is an increasing need for clean, uninterrupted electric power to be provided for today's power sensitive industrial processes. For example, the optical industry, hard disk production, textiles, paper mills, plastic foil production or other complex processes involving rotating machinery incur severe economic losses in terms of damaged product and down time when there is a power interruption or undervoltage condition on the utility grid. In particular, semiconductor manufacturing processes are especially sensitive to interruptions, undervoltage conditions or any discontinuity on the utility grid supplying power to the plant.

The increasing demand for semiconductor wafer manufacturing plants to provide smaller, faster integrated circuits with device dimensions which are approaching the wavelength of visible light has created an urgent need for clean, stable, uninterrupted electric power. As semiconductor wafer processing increasingly requires lithography at deep submicron dimensions, the complex series of lithographic process steps and positioning of wafers become extremely sensitive to even slight variations in power.

Miniaturization, which has been the driving force for achieving performance and cost improvements in very large scale integrated systems (VLSI), emphasizes more reliable VLSI devices as well as higher performance. The objective today in both high speed logic and fast memories is toward higher integration levels. Higher integration levels are seen as the key to obtaining higher device performance. At submicron dimensions, even slight variations in power or minor voltage discontinuities for as little as 50 milliseconds can result in losses of wafers containing integrated circuits worth millions of dollars. Refer to FIG. 7.

The sensitivity of modern VLSI technology to even slight variations in power can be seen from the following example. Major applications in MOS technology as well as increasing use of bipolar structures include polysilicon gate electrodes and interconnects. Poly layers in direct contact with the silicon substrate are used as diffusion sources and buried contacts. High performance devices are realized by means of the extremely high resistivity of lightly doped polysilicon. In device fabrication applications, poly structures must be exposed to an entire range of process technologies such as oxidation, diffusion and implantation. These processes are very sensitive to even slight voltage variations.

Further, VLSI structures and devices are inherently multi-layered with multiple interfaces whose properties may be crucial to the resulting device behavior. As dimensions shrink to 0.25 microns and below, even minor variations in power can detrimentally affect the extreme precision which must be adhered to when implementing VLSI fabrication processes. Processes such as reactive ion etching, plasma enhanced chemical vapor deposition (CVD), diffusion, and ion implantation are inherently electric powered based. Other methods can be used to shrink dimensions of integrated circuits even further, such as extreme ultraviolet lithography (EUV), x-ray lithography and electron beam lithography. Since the foregoing processes are arguably capable of shrinking dimensions smaller than 0.1 microns, such processes are extremely sensitive to undervoltage conditions such as voltage transients induced by lightning, interruptions or sags in voltage due to increased utility demand, or simply an inability to provide clean power due to varying industrial loads.

As lithographic processing becomes ever more complex, it becomes necessary to provide a stable, uninterrupted source of power to steer electron beams or conduct other lithographic processes with complete, invariant accuracy.

Power discontinuities which may have been tolerated even a few years ago are now unacceptable due to the fact that the extremely small device dimensions now magnify any power deviation. Also, the more exacting semiconductor processing technologies are creating an increased power demand. Consequently, semiconductor processing plants are operating at higher electric power levels.

In order to solve the problems in meeting increased power demands and providing an uninterrupted source of clean power to a critical manufacturing process or the like, one conventional approach is the use of distributed power protection (uninterruptable power supply or UPS) at the equipment level. However, implementation of this solution has proven difficult and only partially effective for the following reasons.

It is difficult to identify the critical loads that require immediate protection since the priority of the loads may be changing in accordance with the specific semiconductor processing step being undertaken. Distributed power protection such as UPS at the equipment level also has proven impractical because it is difficult to segregate critical and non-critical loads within a plant. Also, conventional UPS suffers from a lack of industry standards. Consequently, the variety of UPS equipment suppliers has created significant compatibility problems. In addition, studies have found that the proliferation of distributed power protection at the equipment level creates significant problems in terms of internal harmonic pollution. That is, the numerous UPS or power surge protection devices can create unwanted harmonic effects throughout the power system at the equipment level, which further tends to destabilize power on an industrial plant's internal power grid.

Conventional solutions to the problem of electric power transmission stability also may include a superconducting magnetic energy storage (SMES) system such as exemplified in U.S. Pat. No. 4,695,932. A typical connection scheme of a conventional SMES system is shown in FIG. 2. A conventional power conditioning system such as SMES or similar method may not react swiftly enough when a voltage sag is detected. Also, conventional SMES systems, as will be explained infra, generally can not provide back up power to the load fast enough and without creating destabilizing transient voltages. As presently designed, a conventional SMES system also fails to provide a stable, interrupt-free source of power for high power, multiple load applications.

Conventional superconducting energy storage circuit solutions are pulsed in nature and thus require special attention in the area of AC losses and conductor stability under pulsed operation. AC losses during standby mode, due to the ripple introduced by power electronics, motivated prior SMES solutions to use two independent power supplies, one for charging a superconducting magnet, and one for discharging to the load. These power supplies, being rated independently for charging and discharging duty, in turn elicit the need for at least two switches that must be synchronized and activated simultaneously during voltage sags or interruptions. Such a conventional circuit topology leads to a slow response in providing back up power to a load. At high power levels, and using conventional circuit topology, it would not be possible for a conventional SMES to respond fast enough to protect the load.

It is desirable to connect the storage to the load and the grid through a single power converter and a single switch. Recent advances in power electronic devices allow for the construction and implementation of a power converter with reduced on-state losses.

A conventional SMES power converter uses a gate turn off device (GTO) which typically has a voltage drop of 3.5 volts when closed. When open, the stand-off rating is approximately 4,000 volts. The on state losses are determined by the current multiplied by the voltage. At 15,000 amperes, a conventional SMES incurs on-state losses in a range of about 10–100 kilowatts.

In contrast, an aspect of the present invention uses gate commutated thyristors (GCT) which experience on-state losses of only approximately 2.7 volts per switch. That is, a GCT has an on-state voltage drop of only approximately 2.7 volts as opposed to the usual 3.5 volts for a conventional GTO.

AC losses in a conventional SMES system therefore are a limiting design aspect which prevents a conventional superconducting energy storage circuit from supplying back up power, free of potentially damaging voltage transients, to a power sensitive load such as a semiconductor manufacturing plant. Unacceptable AC losses also act as a design limitation and prevent a conventional SMES system from providing back up power to a plurality of loads such as an industrial park.

In an attempt to solve the problem of unacceptable AC losses, U.S. Pat. No. 4,695,932 uses a separate AC/DC converter to trickle charge the superconducting magnet and teaches the use of a separate AC/DC converter to support power to the load and adds a capacitor between a chopper and AC/DC converter circuit. This added complexity requires at least two points of connection and alternate circuit paths between the utility grid source and the load. See FIG. 2. The additional complexity of the connection including the use of a separate AC/DC converters to charge the superconducting magnet as well as a separate AC/DC converter to support power to the load significantly slows down the response of the SMES to detection of a potentially damaging power sag. The added complexity also increases the occurrence of voltage transients and distortions upon connecting the superconducting magnet to the load. This conventional design precludes the use of this type of SEMS system for protecting a large industrial load, such as an entire semiconductor processing plant which is sensitive to voltage transients.

U.S. Pat. No. 5,329,222 is directed to a system for compensating for utility distribution line transients such as voltage sags. The system uses an energy storage system and inverter for generating a voltage which is injected in series with the distribution line voltage. The generated voltage does not provide full power to the line, but rather only compensates for differences from a desired utility reference voltage. A major disadvantage is that the system cannot restore an active power vector without storage. Such a conventional system is not capable of supporting a complete power outage on the grid, it is only effective during voltage sags.

Another disadvantage of this teaching is that it lacks enough storage capacity to compensate for a complete outage on the utility distribution line. Inherent design limitations imposed by the inverter and the inability to provide a complete disconnect from the distribution line further preclude the application of this type of back-up energy system for controlling a plurality of loads depending from a single utility substation.

A conventional shunt connected superconducting energy stabilizing system such as described in U.S. Pat. No. 5,514,915 has at least two points of connection and two circuit paths between a power source and a load. The superconducting magnet is fed by an AC/DC converter which is separately coupled to the power source through one of the circuit paths. During periods of voltage sag or a power outage, an isolation switch on another circuit path provides isolation of the load from the power source so that energy can be supplied to the load from the superconducting magnet through a DC/AC converter. This system uses separated converters on separate circuit paths for both energy directions from and to the magnet. Accordingly, it is very difficult to switch or to coordinate both circuit paths simultaneously in the event of a voltage sag or power outage, especially at higher loads. Also, such a system has a disadvantage of added complexity since special control means are required.

The teaching of U.S. Pat. No. 5,514,915 could not be used to interface between a utility substation and a multiple power sensitive high output loads such as a plurality of plants comprising an industrial park, for example. The separated converters on separate circuit paths and two points of connection to and from the load and the utility grid impose severe design limitations which preclude the adaptation of this system for high power applications. A major problem is the complexity involved in coordinating the opening and closing of high power switches. The switching timing becomes increasingly difficult to achieve at such high power applications. This application can not be used to quickly ramp-up to the desired load operating current without creating voltage transients induced by the connection to the utility source. This solution will only work for lower power applications.

U.S. Pat. No. 5,376,828 also discloses a conventional shunt connected SMES having two separate circuit paths between a utility grid and a load. Separate converters keep the energy storage system charged. As in U.S. Pat. No. 5,514,915 separate converters are necessary for keeping the energy storage component charged and for full power discharge to support the load. The additional components and separate circuit paths appear to be necessary to compensate for small perturbations in the grid without having to exercise the entire superconducting magnet or energy storage system. This would be necessary to avoid energy losses when exercising the full switching of the grid into the energy back-up and recovery system. Full switching of the grid into the energy storage system unnecessarily exercises the superconducting magnet and imposes the danger of overloading the superconducting magnet if the current from the grid is not carefully controlled.

In order to overcome problems in enhancing utility power standards as required by refinements in power sensitive manufacturing processes, what is needed is a system which can provide plant-wide protection between the utility grid and a power sensitive industrial application such as semiconductor manufacturing, optical processes, hard disk production, integrated circuit fabrication, or any complex manufacturing process involving rotating machinery.

In view of the critical importance for providing uninterrupted and smooth power to all phases of VLSI device manufacturing, what is also needed is an energy management system for detecting, within milliseconds, any type of potentially damaging power distortion appearing on a utility grid, and for substantially instantaneously disconnecting the load to be protected from the grid. At the same time, the energy management system must provide an uninterrupted source of clean power to the load with substantially instantaneous ramp up to the necessary power level and deliver that power without distortion to the load.

It also would be advantageous to provide a source of back up power with only one circuit connected between the utility source and the load and having only one point of connection/disconnection required between the utility source and the load. When a power transient is detected on the utility line such a system advantageously would be able to switch off from the utility grid and connect power immediately without creating voltage transients.

It also would be desirable to provide a system which eliminates the need for separate converters for keeping the energy storage system such as the superconducting magnet charged and ready for full power discharge to support the load. The use of a single DC/AC converter could be used to keep both the energy storage system charged during standby or discharge its energy during voltage sag protective operation. This advantageously would provide only one switch between the utility grid and the load and thus would allow faster ramp-up of power to the load without the voltage transients inherent in a separate connection to the utility power grid. Such a system also should be capable of providing continuous reactive power voltage control.

What is also needed is a SEMS with a capability of providing a variable impedance in order to create a virtual grid. This would enable a SEMS to increase voltage regulation to a load for perhaps up to ten percent, rather than the conventional five percent without exercising the superconducting magnet or other energy storage of the SEMS. While the system is connected and while the switch to the SEMS is closed and the load is connected to the grid, it would be advantageous if the power connection of the SEMS could be used to regulate the voltage on a continuous basis, without exercising the energy storage of the SEMS or the switch to the grid. This voltage regulation can be done within limits which depends on the reactive power rating of the converter and the short circuit power of the grid to which the load and SEMS are connected.

For example, if the load is connected to the grid with a short circuit power of 1,000 megavolt amperes (MVA) and the power control system (PCS) is rated at 50 MVAR, then a SEMS should be able to regulate power on a continuous basis to five percent without exercising the magnet. Accordingly, there is a need to increase the range of continuous voltage regulation without exercising the stored energy of the superconducting magnet.

The foregoing attempts to solve the problem of utility voltage instability delivered to a power sensitive load are restricted to relatively low power applications due to inherent design constraints on the SMES system which also limits the size of the superconducting energy storing magnets. None of the foregoing conventional SMES system applications would be capable of interfacing between the utility grid and a plurality of power sensitive customer loads, such as an industrial park or a plurality of semiconductor manufacturing plants.

Therefore, what is also needed is an energy management system for interfacing between a utility grid and one or more manufacturing plants, such as an industrial park, which accurately can predict the onset of a voltage disturbance, completely truncate that disturbance from a selected load and provide a substantially uninterrupted, stable source of power to the selected load for the duration of the interruption or until back-up power generation is brought on line. This advantageously would eliminate the present need for a multiplicity of power control circuitry located throughout a plant which itself creates harmonic interferences and power disturbances within a plant's own power grid.

Another shortcoming of a conventional SMES system as described above is the inability to provide substantially instantaneous ramp up of back-up power to the load in an invariant, expected manner such that the critical power characteristics of the supplied power conform to a predefined set of industrial power quality parameters.

Therefore, what is also needed is a predictable source of back-up power which can be provided substantially instantaneously when needed. It also would be desirable if the critical response time and voltage/current levels of the back-up power always conformed to an industrial power quality standard that governs the operational parameters of the load. For example, semiconductor manufacturing plants universally require operational characteristics within the parameters of a practical undervoltage operating limit. Examples of such practical undervoltage operating limits comprise the so-called CBEMA curve or the ITIC curve. A practical undervoltage limit provides a standard measure for available response time so that equipment is maintained within functional operating parameters. (See FIG. 7). What is needed is a back up energy management system which in every event could be relied upon to invariantly provide substantially instantaneous back up power with characteristics which conform to the parameters of a practical undervoltage limit and which could maintain equipment within expected operating parameters.

Another problem with conventional SMES technology is the production of an unwanted, potentially adverse magnetic field extending beyond the cryogenic enclosure. A strong magnetic field can have a serious effect upon persons wearing old style heart pacemakers, for example. Therefore, what is also needed is a superconducting energy management system which has a magnetic field at the facility fence line which is within an acceptable level of exposure to workers.

SUMMARY

In order to overcome the aforementioned disadvantages and shortcomings of a conventional SMES, an aspect of the present invention provides a superconducting energy management system (SEMS) for insuring power quality for an entire industrial plant or group of plants. The present SEMS is installed at a single location where power enters the plant or group of plants such as an industrial park. This advantageously eliminates the need for power conditioning circuitry distributed throughout a plant or group of plants and further eliminates the disadvantages of harmonic pollution associated with such distributed power conditioning circuitry. This aspect of the invention advantageously insures that power quality measures will not impact the layout and operation of a plant's production equipment and that power quality related maintenance cost can be substantially reduced. This aspect of the invention has the capability to provide power at levels of about 2–200 MW or higher, for periods of from 0.015 to 10 seconds to ride-through short duration and power fluctuations or losses.

An aspect of the invention advantageously provides a single point of connection between the utility grid and the one or more loads being powered. This achieves a substantially transient-free ramp-up of power to the load.

Another aspect of the invention provides the benefit of site-wide protection for a group of manufacturing plants comprising an industrial park or the like. In this instance, the present SEMS interfaces between a utility grid substation and a plurality of loads. This aspect of the invention overcomes the problem of harmonic distortion and increased power instability which are inherent in conventional distributed power control circuitry.

Another aspect of the invention uses a complete disconnect from the utility grid at single point of connection to solve the reconnection transient problem and provides substantially instantaneous, transient-free switch over and ramp-up to the load. This is achieved in part through a unique control system comprising a combination of detection and switching circuitry which monitors the direction of incoming power and voltage sags within milliseconds, uses the single point of connection between grid and load to cut off utility power substantially instantaneously and provides transient-free power to the load without distortion and substantially instantaneously.

In accordance with an aspect of the invention, the magnet is configured so as to minimize fringe magnetic fields, and to substantially limit magnetic fields to the cryostat enclosure. This advantageously avoids adverse effects on biological systems or medical implants. The present SEMS facility is designed so that the magnetic field is below 0.5 milliTesla (mT) in all areas accessible to the general public.

DESCRIPTION OF DRAWINGS

These and other features, aspects and advantages of the present invention will become better understood with regard to the following descriptions, appended claims and accompanying drawings in which:

DETAILED DESCRIPTION

Figure 1:
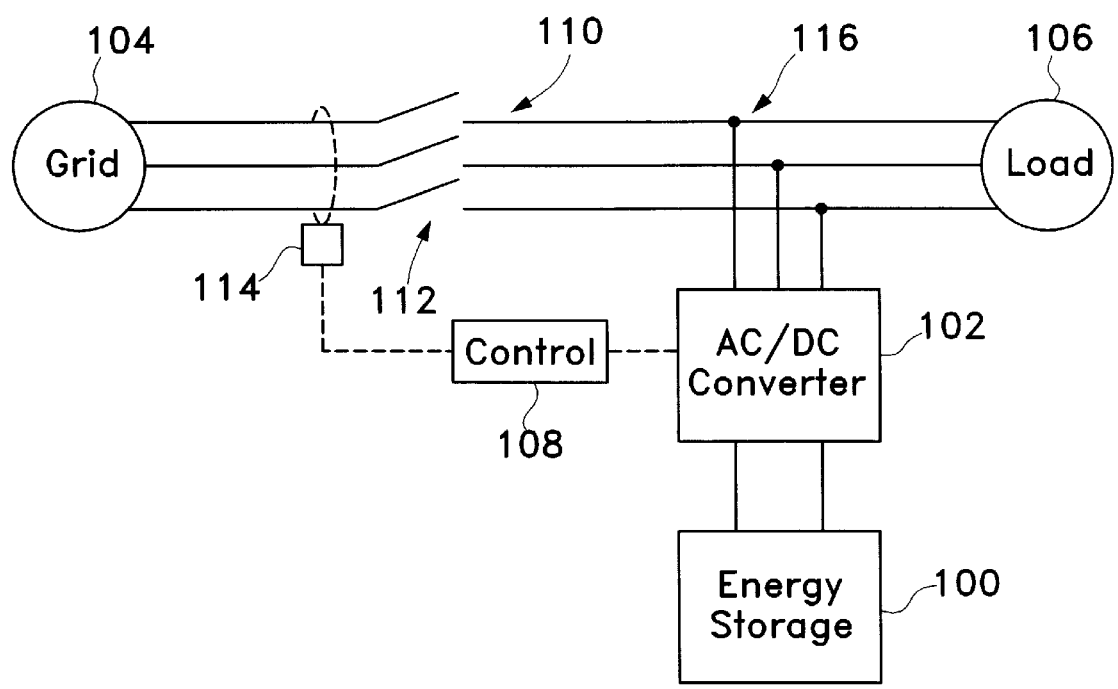
FIG. 1 is a block diagram showing a SEMS in accordance with an aspect of the present invention.

FIG. 1 shows a superconducting energy management system (SEMS) in accordance with an aspect of the present invention. The SEMS has the capability to provide power levels in a range of 2–200 megawatts (MW), or higher for an operational time of from 0.015 seconds to 10 seconds. The present SEMS also has an energy storage capability in a range from 25 megawatt seconds (MWs) or megajoules to 1000 MWs or megajoules. An energy storage unit 100, such as a superconducting magnet is connected through an AC/DC converter 102 to a utility grid 104 and a load 106. However, other devices for storing energy (e.g., flywheel, battery, capacitor, or fuel cell) also could be used for the energy storage unit 100. The SEMS comprises an energy storage unit 100, AC/DC converter 102 and appropriate control circuitry 108 for detecting an undervoltage condition on the utility grid 104, and associated power lines 110. All elements shown are three-phase, but also could be single-phase, or any number of phases as is well understood by one skilled in the art.

In accordance with an aspect of the invention, a single switch 112 is provided for disconnecting the load 106 from the grid 104 when an undervoltage condition is sensed by the control system 108. An undervoltage condition is defined as a voltage interruption, voltage sag or other discontinuity due to electrical storms or power outages. An undervoltage condition also may be caused by excessive demand on the utility grid. The AC/DC converter 102 is used both to keep the energy storage unit 100 charged during standby or to discharge the energy of the energy storage unit 100 during full power operation.

During normal (standby) operation, the switch 112 is in the closed position. The load 106 receives power from the grid 104 along utility lines 110. The control system 108 includes a sensor and active feedback line 114 which continuously monitors the utility lines 110 for the undervoltage and outage conditions. During normal or standby operation, the control system 108 commands the AC/DC converter 102 to keep the energy storage unit 100 charged but on "idle", that is, no real power is drawn from the store into the load 106. The SEMS system is therefore invisible to the load. However, reactive power control is still possible during this standby mode and moderate voltage sags can be corrected. During a more severe voltage sag or an outage, the control system 108 commands the switch 112 to open and disconnect the load 106 from the grid 104.

An aspect of the invention provides that, simultaneously with the opening of the switch 112, the control system 108 commands the AC/DC converter to start drawing energy from the energy store 100 and to supply power to the load 106 through the output leads 116 of the AC/DC converter as shown. Once the undervoltage condition is over, the control unit follows a reversed sequence.

It will be appreciated that due to the single switched connection 112 between the grid and the load, the load can be instantaneously isolated from the grid by activation of switch 112. Simultaneously, upon activation of switch 112, the AC/DC converter applies back-up power to the load from the energy storage device 100. The simultaneous operation of both grid isolation and transfer to back-up power is made possible by the fact the control unit 108 uses the same signal to both disconnect the load from the grid and to activate the AC/DC converter. Since the load is completely isolated from the grid when the AC/DC converter supplies power, the transfer of power from the energy storage device 100 to the load is substantially transient free. Also, due to the single control unit which simultaneously isolates the grid from the load and transfers the power from the energy storage unit into the load, the ramp up of back-up power to the load is likewise transient free and instantaneous.

The single switchable connection can comprise a single phase, three phase or multiphase connection as is well understood by one skilled in the art. The response provided by this aspect of the present invention makes possible the support of larger loads on the order of 2 MW to 200 MW and above. The support of such large loads was not previously possible with a conventional superconducting magnetic energy storage (SMES) device.

Figure 2:
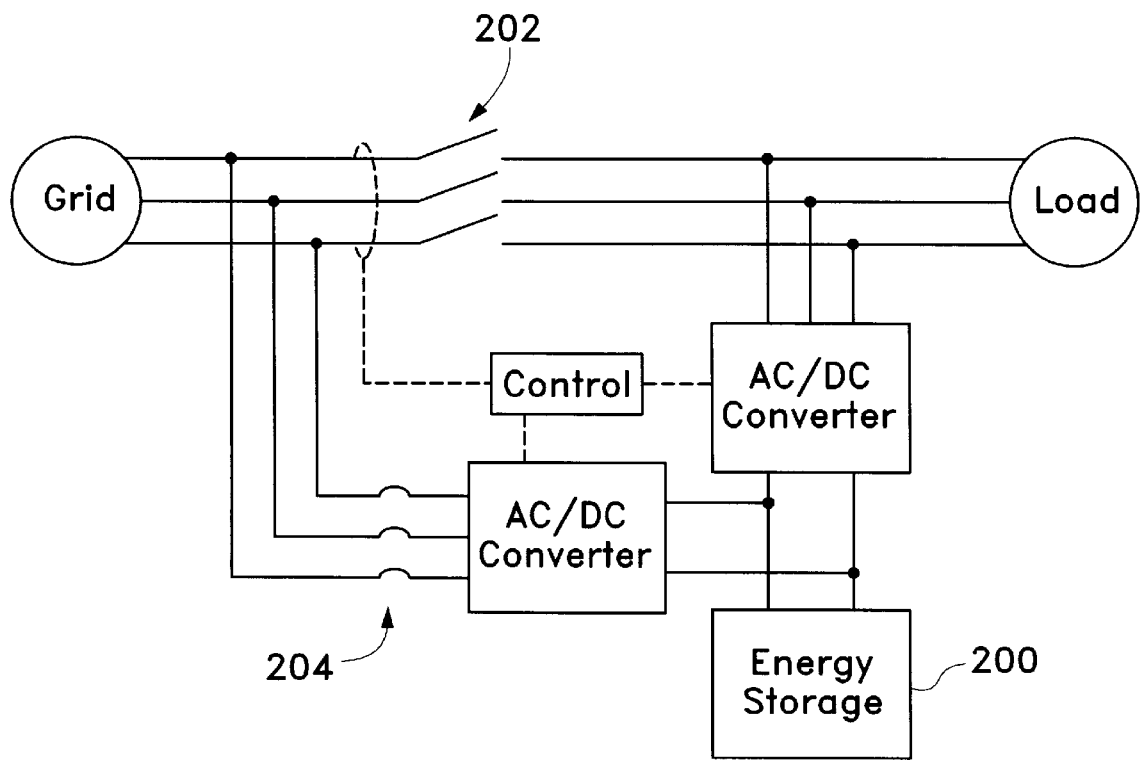
FIG. 2 is a block diagram showing a conventional energy storage and back-up system for supporting a load.

FIG. 2 shows a conventional SMES device which typically requires two AC/DC converters with multiple points of connection between a grid and load. In a conventional SMES, it is not possible to isolate the grid from the load with a single switch and to simultaneously release the energy stored in the energy storage device into the load through a single AC/DC converter.

As shown in FIG. 2, a conventional SMES has two circuit paths between the grid and the load. The entire system must be connected and disconnected in at least two places at switches 202 and 204 when switching energy from the energy storage device to and from the load.

For example, another disadvantage concerning the circuit topology of FIG. 2 is that it requires coordination of two switches during operation. Also, additional components are necessary to attempt to differentiate between large and small voltage sags so as to avoid exercising the full switching of the load into the energy backup and recovery system. If the current from the grid is not carefully controlled, this would exercise the superconducting magnet unnecessarily and pose the danger of overloading the superconducting magnet.

Figure 3A:
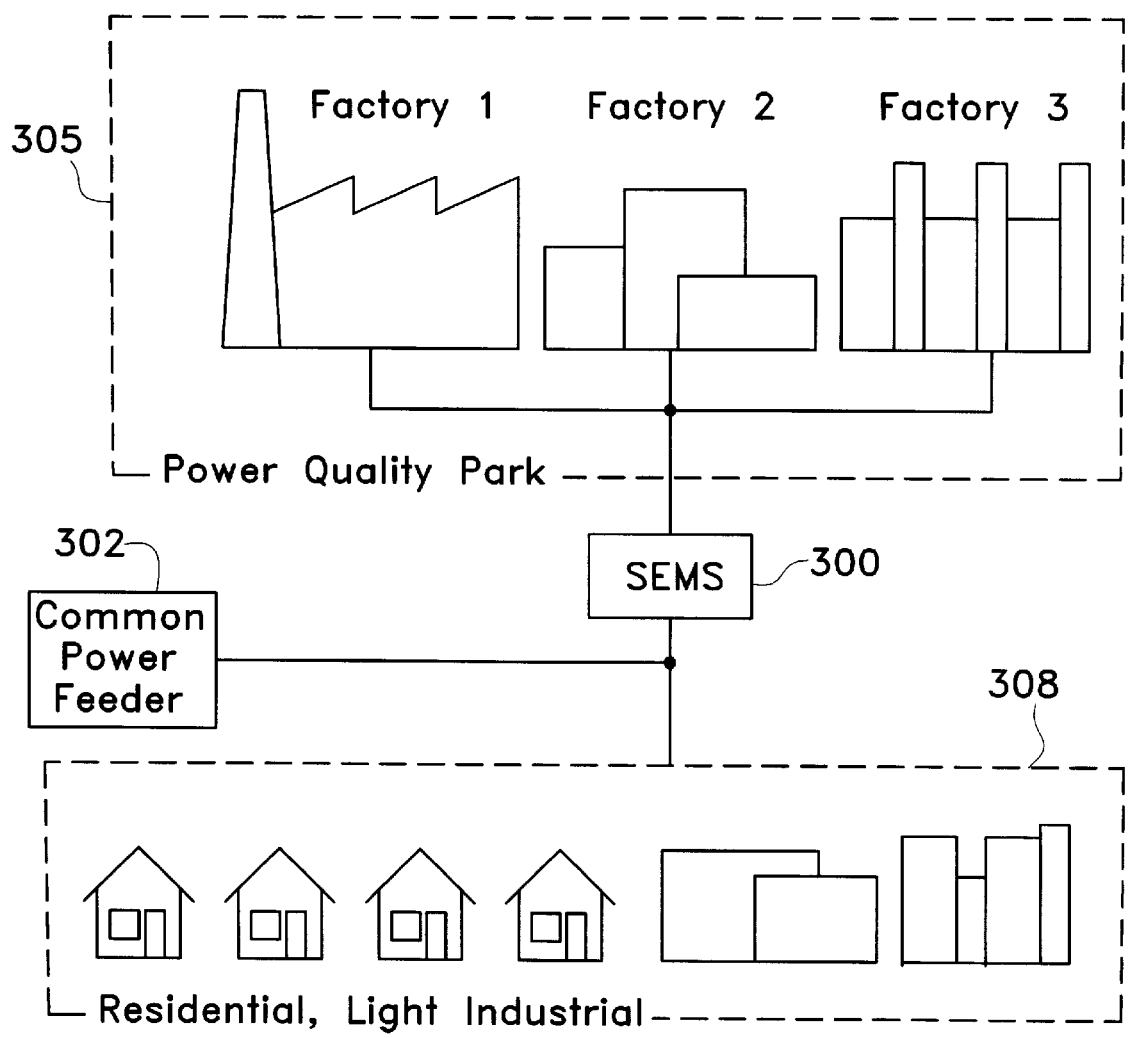
FIG. 3A is a block diagram showing a SEMS for providing power to an industrial park in accordance with an aspect of the invention.

Referring to FIG. 3A, an aspect of the invention provides a SEMS which has the ability to interface between a substation or common power feeder 302 and a plurality of industrial loads, 305 shown as factories 1, 2 and 3, respectively. The SEMS provides an at the fence solution for transferring high quality back-up power to several loads.

As shown in FIG. 3A, power consumers such as residential or light industrial users generally need to be concerned only with power interruptions. However, for many industrial users, particularly semiconductor manufacturing plants, interruptions of only a few cycles duration or voltage reductions of less than 10% are highly problematic. As explained previously, even minor undervoltage conditions or power fluctuations may cause tripping of relays, misoperation of controls, varying speed of robotics and drives and consequent process stalling. Resulting damages from both product degradation and lost production time can be considerable. The current approach is to protect against such events by adding uninterruptable power supplies (UPS) at individual drives, computers and processors throughout an individual factory or plant. This point specific technique has several disadvantages. It is expensive both in terms of capital and maintenance costs, and contributes to additional system sensitivity due to the harmonic pollution associated with each individual installation of a power controlled system. By increasing the power capacity of such power quality systems, adverse effects sometimes can be reduced. However, such systems can only handle assured quality industrial power requirements involving loads of a few megawatts. Also, enhanced point specific power supply systems are not easily scalable to higher loads.

As shown in FIG. 3A, a SEMS in accordance with an aspect of the invention would ensure power quality for one or more entire industrial plants. The inherent scalability of the modular SEMS according to an aspect of the invention makes possible its use in higher power applications than was previously possible. The SEMS 300 can be installed to interface between a common power feeder or substation 302 and a plurality of loads at a single location-where power enters the facility, in this case power quality park 305 as shown in FIG. 3A. In accordance with an aspect of the invention as will be explained, the SEMS 300 is provided in a modular fashion. The modularity of a plurality of superconducting magnetic storage devices and associated power converters provides a means for expanding the energy band that the SEMS can support cheaply without increasing the capital cost of the unit.

A SEMS 300 in accordance with this aspect of the invention has the capability to provide power levels of about 2 MW to 200 MW or higher for periods up to ten seconds; delivering a net energy of about 25 to 1000 MWs to ride through short duration power fluctuations or losses. In addition, the present SEMS system can be coupled with fast-start diesel powered generators to provide continuous protection through a longer term blackout, essentiality enabling off-the-grid operation. The solution provided by this aspect of the invention has the advantage that power quality control measures will not impact the layout and operation of production equipment and that power quality related maintenance costs can be substantially reduced.

Control System For Prioritizing A Plurality Of Loads

Figure 3B:
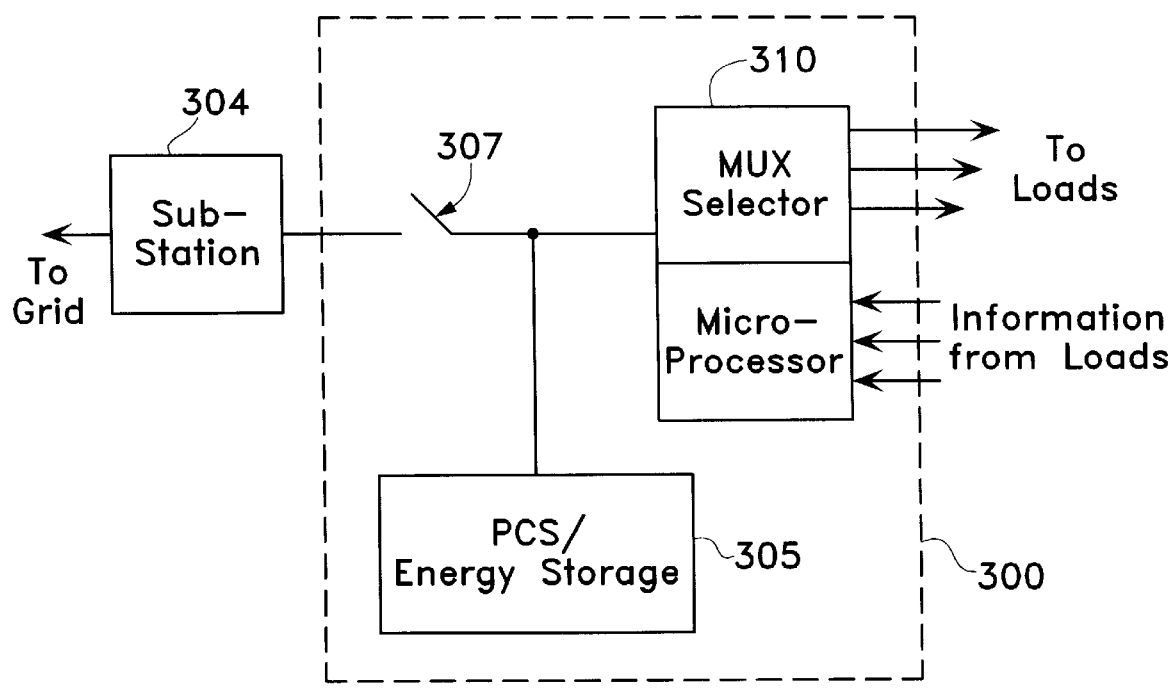
FIG. 3B is a block diagram showing a system for prioritizing power delivery to a plurality of loads in accordance with an aspect of the invention.

In accordance with an aspect of the invention, FIG. 3B shows a control system for coupling a SEMS to a plurality of loads and for providing a priority ordering of the energy needs of the loads for a given time interval such that when an undervoltage condition is detected on the utility grid, energy can be provided to the loads from the SEMS in accordance with the operating requirements of each load at the time that the grid is isolated from the loads. It is understood that the plurality of loads also may be provided by a major load which comprises a plurality of sub-loads.

In FIG. 3B, SEMS 300 is connected to one or more loads downstream from a substation 304. The loads are connected to the substation 304 through a single point of connection. A single point of connection switch 307 isolates the grid and substation from the loads in the event that a power outage or undervoltage condition is detected on the grid as previously explained. The single point of connection switch 307 provides a complete disconnect of the loads from the utility grid. Simultaneously, the energy stored in the SEMS 300 is transferred to the loads through the multiplexer/selector 310. Due to the fact that the grid is completely isolated from the loads at this point, the transfer of energy from the SEMS into the load is transient-free.

In accordance with an aspect of the invention, the multiplexer/selector includes a microprocessor circuit for continually sampling information from each load concerning power quality requirements over a specific time interval. This makes possible the provision of quality standby power to a plurality of industrial loads in accordance with their energy requirements at a specific period of time. For example, one load may comprise a smelting system which must be kept in operation for 24 hours, but which may not be as susceptible to brief undervoltage conditions. Another load may comprise a semiconductor manufacturing plant operating with extreme UV lithography for only a particular time interval. The selector, in accordance with techniques which are well known is capable of real time prioritization of the loads in accordance with, the sampled information. This makes possible a predetermined scheduling of a particular energy level corresponding to the load requirements of each plant.

When a voltage discontinuity or undervoltage condition is detected by the control system on the grid, the control system disconnects the grid from the load through switch 307. Simultaneously, the control system activates the SEMS for transferring the stored energy into the multiplexer/selector 310. From there, active power from the SEMS is provided to the loads in accordance with the energy need of each load during the time interval affected by the undervoltage condition.

A microprocessor included in the selector circuit stores a record of predetermined optimized power operating parameters for each load. The microprocessor also receives on line feedback on the operational status of the plants in the controlled perimeter. Such optimized operating parameters may include the time periods during which certain power-sensitive operations are being conducted at each plant. The selector circuit also includes a means for comparing the real time operating parameters of each load to the corresponding schedule dependent operating parameter stored in the memory by microprocessor. The means for comparing produces an output signal representative of a priority ranking of the power need of each load over a given time interval. The load selector/multiplexer circuit 310 includes a priority of output leads, each connected to a corresponding load. The microprocessor signals the multiplexer in accordance with the priority ranking of power needs such that the multiplexer circuit selectively switches back-up power from the SEMS into selected loads as a function of power need.

Alternatively, referring to FIGS. 3A and 3B, the microprocessor receives on line information concerning power quality needs for each load 305 of a plurality of loads. The real time active feedback concerning power quality needs is accomplished through well-known power sensing and feedback control systems which can be implemented readily by those skilled in the art without undue experimentation. Accordingly, for any given point in time, the microprocessor knows sensitive loads based on conventional methods of active feedback from each load 305. The microprocessor is thus able to make a priority ranking among various loads based upon their power needs at a point in time when a critical undervoltage condition is sensed on the grid. The microprocessor then utilizes multiplexer 310 to selectively switch power to the loads in accordance with the priority ranking and power needs of each load when a disconnect from the grid is required.

Modular Construction

Figure 4A:
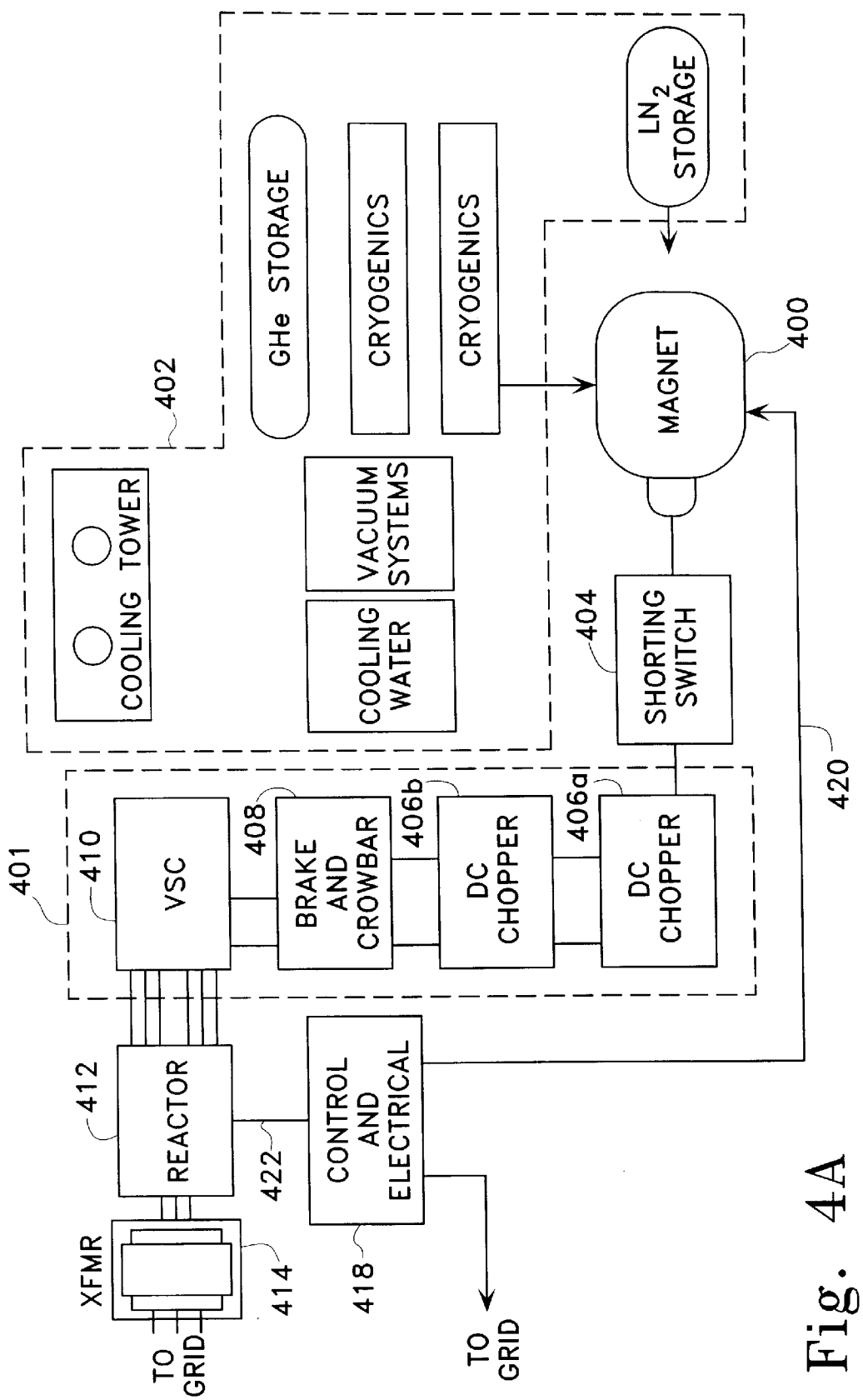
FIG. 4A is a block diagram illustrating the modular construction of a SEMS according to an aspect of the invention.

The modular aspect of a present SEMS is explained with reference to FIGS. 4A–4C. An aspect of the invention provides a modular SEMS for providing scalable back-up power to one or more loads connected to a utility grid. FIG. 4A shows a connection scheme for building a complete SEMS from modules. FIG. 4 shows one way of partitioning the modules to build a SEMS facility. The SEMS of FIG. 4A is an exemplary system rated in power from 2 MW to 200 MW or higher which is capable of storing energy of up to about 1000 megajoules (MJ). The system is modular, meaning that it can be assembled using subsystems that are small, light enough to transport individually and which can be easily connected to scale energy output to meet future. Increased power requirements. Modular interconnects are provided such that the connect/disconnect of each modular unit can be accomplished in a short time period. It will be appreciated that the entire SEMS, once installed as a unit at a site, can be fully disassembled and moved to a second location after reaching its useful life at the first site. As shown in FIG. 4A, a superconducting magnet 400 is cooled through a modular cryogenic cooling system 402 comprising a cooling tower, for receiving a quantity of cooling water, a vacuum system, and standard cryogenic cooling systems as shown. It will be appreciated that the cryogenic cooling systems are also fabricated in a modular arrangement in order to be scalable upwards for providing appropriate cooling for a plurality of superconducting magnets 400 as will be explained with reference to FIGS. 4B and 4C.

Superconducting magnet 400 has an output lead provided through shorting switch 404. The function of shorting switch 404 is to provide protection and isolation for the magnet and the chopper. The superconducting magnet 400 is connected to a power conversion system 401, which in turn provides power to the grid through reactor 412 and transformer 414.

The power conversion system 401 includes a voltage source converter 410, brake and crowbar circuit 408 and choppers 406a, 406b. As is readily understood by those skilled in the art, the choppers 406a, 406b also can be DC to AC converters or AC to DC converters, or can comprise other equivalent power converters. The system is not limited to the use of a voltage source converter 410, but alternatively could be constructed with a current source converter as is well understood by one skilled in the art.

A plurality of DC chopper systems 406a, 406b are shown connected in series with a brake and crowbar circuit 408. The output of brake and crowbar circuit 408 is coupled with voltage source converter (VSC) unit 410. The output from VSC unit 410 is coupled with reactor 412, which, in turn, provides power to transformer 414. Transformer 414 then provides one phase, three phase or multiphase output power to the grid as needed. As explained previously, a control unit 418 monitors the grid for an undervoltage condition and has leads 420, 422, respectively, for activating the superconducting magnet and reactor.

Figure 4B:
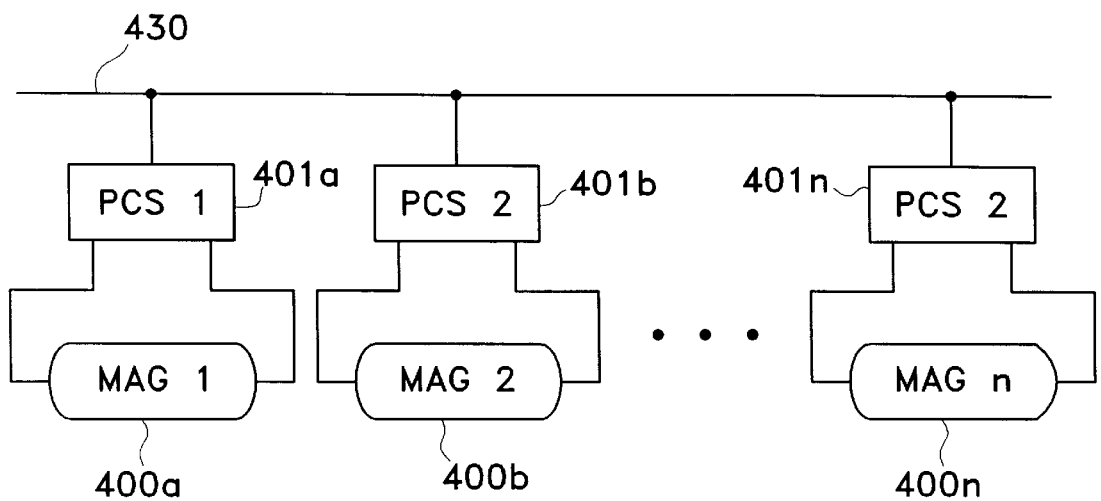
FIG. 4B is a block diagram illustrating a modular arrangement of superconducting magnets and a power converter system according to an aspect of the invention.
Figure 4C:
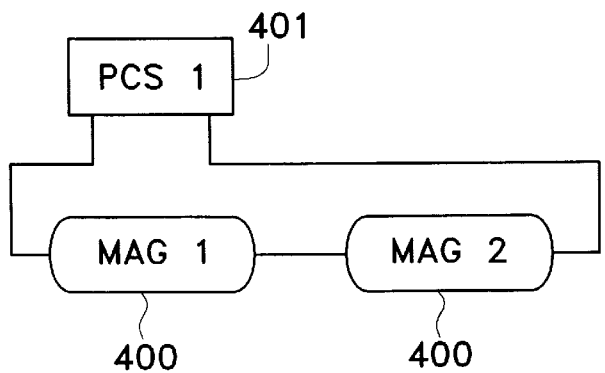
FIG. 4C is a block diagram showing a modular arrangement of superconducting magnets and power converter systems for scalable power applications, according to an aspect of the invention.

The modular arrangements of superconducting magnet 400 and associated power converter system 401 are shown with reference to FIGS. 4B and 4C. The energy storage system comprises a plurality of superconducting magnets, each superconducting magnet being modular for ease of transportation and being readily linkable to another superconducting magnet or power converter for providing a scalable source of stored energy and power. The modular configuration of magnets enables a SEMS, according to this aspect of the invention, to provide continuous voltage support of the utility grid. The modular aspect of the invention as shown in FIGS. 4B and 4C also provides a means for expanding the energy band which the SEMS can support cheaply and without increasing the capital cost of the SEMS. It will be appreciated that with the same storage and rating of power converters 401 and associated superconducting magnets 400, a SEMS according to this aspect of the invention, can greatly increase effective voltage regulation of the utility grid, up to ± ten percent.

This aspect of the invention enables a SEMS to ride through as many voltage sags as possible without opening the switch or exercising the superconducting magnet unnecessarily. Since the superconducting magnet is not exercised, AC losses are considerably reduced. As shown in FIG. 4B, a plurality of superconducting magnets 400a, 400b, . . . 400n are connected with a corresponding power converter system 401a, 401b, . . . 401n. The magnets 400 and corresponding power control systems 401 each provides a separate module which can be connected in parallel through the bus 430. Alternatively, multiple superconducting magnets can be connected in series with one or more associated power converter systems 401 as shown in FIG. 4C.

The modular aspect shown in FIGS. 4B and 4C makes possible the scaling up of power by connecting the power converter systems 401a, 401b, 401n in parallel.

The energy from the superconducting magnets 400a, 400b and 400n is scalable by connecting the superconducting magnets 400 in series as shown in FIG. 4c. It is important to emphasize that the modular configuration of the present invention can be accomplished independently of the grid because of the single switch configuration. The modular aspect of the invention provides other advantages in terms of improved transportability of smaller SEMS units, ease of providing redundancy, ease of assembly and disassembly, improved matching of power/energy to the needs of the PCS modules, greater flexibility in configuration and ease of standardization, and enhanced ability to reconfigure a modular SEMS for specialized applications.

It will be appreciated that the single point of connection between the grid and load, in accordance with an aspect of the present invention, makes possible for the first time, the modular connection of superconducting magnets and power converter systems in series or parallel depending upon how much power is needed by the load. This aspect of modularity provides a significant advantage over a conventional SEMS. The multiple switches and points of connection between the load, the conventional SEMS and the grid formerly precluded modularity.

A plurality of AC/DC converters are also modular and easily connectable in varying configurations for current sharing and for enabling the scalable store of energy to be readily adapted to high power applications than was previously possible with conventional, nonmodular systems.

The modularity aspect of the present SEMS also provides the advantages of an energy storage system which can be easily manufactured, transported, installed and upgraded as needed. The modular aspect of the invention also greatly simplifies repair and enables a SEMS to have defective components easily replaced, without the necessity of shutting down the entire system for long periods of time.

Control Logic

Figure 5:
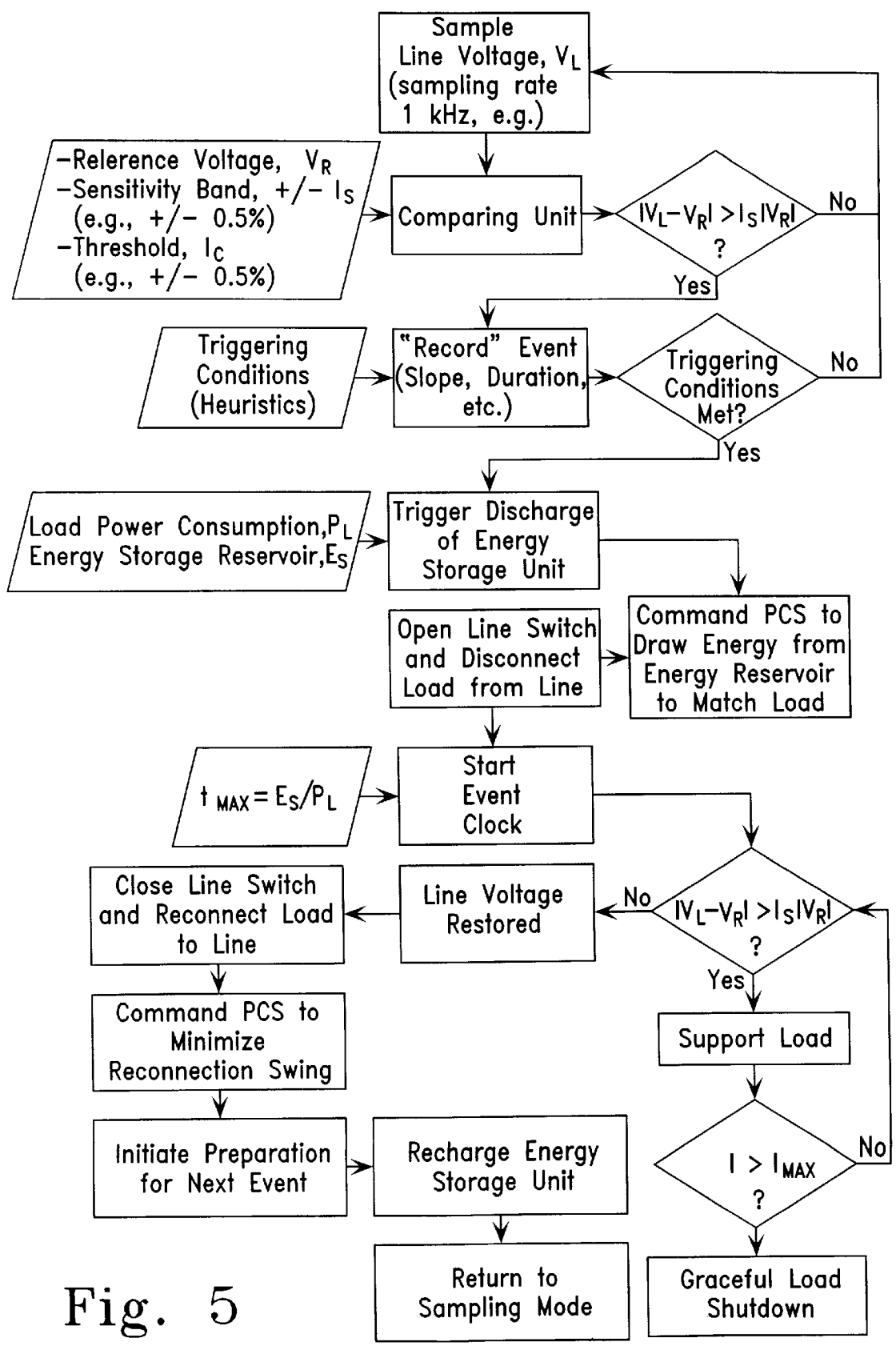
FIG. 5 is a block diagram of the control logic of a SEMS in accordance with an aspect of the invention.

FIG. 5 shows a block diagram of the control logic. The line voltage is sampled, for example at a rate of 1 kHz or higher (limited only by the state of the art in microprocessor technology), and compared against a reference voltage. If the deviation is within a tolerance band, for example within 0.5%, no action is taken. If the deviation is greater than the sensitive band, then it is considered an "event," that is, a possible voltage sag or interruption and a recorder means is started. A heuristic evaluation, as is well known to those skilled in the art, is used to determine if the event is indeed a voltage sag or a spurious signal. If it is determined that the event is a genuine undervoltage condition such as a sag or interruption, or if the line voltage falls below a prespecified limit, for example below 95% of reaching nominal, then the control system triggers a protection sequence.

Triggering Conditions for Shunt-Connected SEMS

In a shunt-connected SEMS with a single switchable point of connection between the grid, the load and the SEMS, the load is isolated (disconnected) from the utility grid during a voltage sag/interruption and fully supported by the SEMS. An important aspect of the control system is how the decision is made to activate the switch, e.g., at what point the load is isolated and the SEMS takes over. This is important because if the decision is taken too late, the load runs the risk of being unprotected, while if the decision is taken too soon, there is a risk of incurring too many 'false starts' in which the load is isolated when there was not a real problem on the grid.

The general control logic for activation of the SEMS is presented at FIG. 5. This section is specifically concerned with the development of the triggering conditions. The algorithm to determine the time at which to disconnect from the grid is based on standard power quality criteria for practical undervoltage limits, for example, the so-called CBEMA curve or its derivatives such as the ITIC curve. See FIG. 7. These criteria for power quality acceptability are based on extensive statistics from actual equipment, and the plots take the form of voltage sag vs. time. The envelope represents the maximum time (in ms or cycles) that the equipment can ride through a sag of the specified depth (as % of nominal voltage) without being affected.

It is possible to curve-fit the power acceptability envelope to express the maximum ride-though time versus depth of sag. If a single curve fit is desired, then a rather complex expression is needed. To keep the analytical expression simple, the curve-fit is done in segments as follows:

$t_{max}=13.29[Ln(1/1-v)] 0<v<0.7$ $t_{max}=749.8[Ln(1/1-v)-1.18263] 0.7<v<0.8$ $t_{max}=4154.8[Ln(1/1-v)-1.53242] 0.8<v<0.9$ $t_{max}=\infty\ 0.9<v<1$ where $t_{max}$ (in ms) is the maximum time the equipment can ride through a sag of magnitude "v", v being the non-dimensional ratio of actual voltage to nominal voltage (e.g., v=0.8 means that the voltage is 80% of nominal, or, that a 20% sag has occurred).

The triggering logic is based on measuring the depth of the sag (done at a fast rate of sampling) and computing the maximum ride-through time. A safety factor can be imposed and the SEMS activation (opening switch) can take place at a fraction of $t_{max}$. The algorithm consists of keeping track of the duration of the sag, comparing said duration with the instantaneously computed $t_{max}$, and as soon as the limit is reached, the trigger command is issued. The logic will be illustrated with an example.

EXAMPLE

In this example a sampling rate of 1 kHz is chosen. This means the voltage is measured at intervals of 1 ms (for a 60 Hz system, 16 samples per cycle, or 4 samples per quarter-cycle). The controller has a set point for sensitivity of 0.5% (i.e., variations of less than 0.5% are considered "noise" and ignored), and a threshold of 5% (i.e., an "event" is defined when the voltage drops below 95% of nominal). A safety factor of 2 is used for the definition of the triggering time (i.e., the trigger time will be half of that defined by the expressions of $t_{max}$ given above). N denotes the sampling cycle from the beginning of the event (i.e., t=Nx1=N ms is the elapsed time of the event, $V_N$ is the measured voltage ratio in cycle N). The logic is as follows:

1.- For a given N, compute elapsed time (N ms) and measure $V_N$
2.- Determine the range of $V_N$ (i.e., less than 0.7, between 0.7 and 0.8 etc.)
3.- Using $V_N$ and the appropriate expression (see above) determine $t_{max}$, use 0.5 $t_{max}$ as trigger point
4.- If N ms is equal or greater than 0.5 $t_{max}$, command to open the switch and engage SEMS, otherwise, increment N by one (next sampling cycle) and return to step 1.

The logic for opening the switch 112 is explained with reference to FIGS. 1 5 and 9. The control unit 108 is connected to the grid 104 upstream of the switch 112 through one or more sensors 114. Control unit 108 triggers the switch 112 to disconnect from the load and simultaneously connects the energy storage device 100 through AC/DC converter 102 to the load based upon a variety of factors which are weighted in proportion to their importance in predicting a critical undervoltage condition or power outage. For example, control unit 108 monitors the power direction on the grid to determine whether a power reversal has taken place. This is a major factor in opening the switch and simultaneously switching the energy storage of the SEMS into the load 106.

In accordance with an aspect of the invention, a statistical weighting is associated with various factors which the control unit 108 measures and takes into account in order to determine whether the switch 112 should be activated. The factors which are sensed by sensors 114 include power direction, voltage magnitude and the locus of the positive vector of voltage on the standard three phase line shown at 110.

Figure 9:
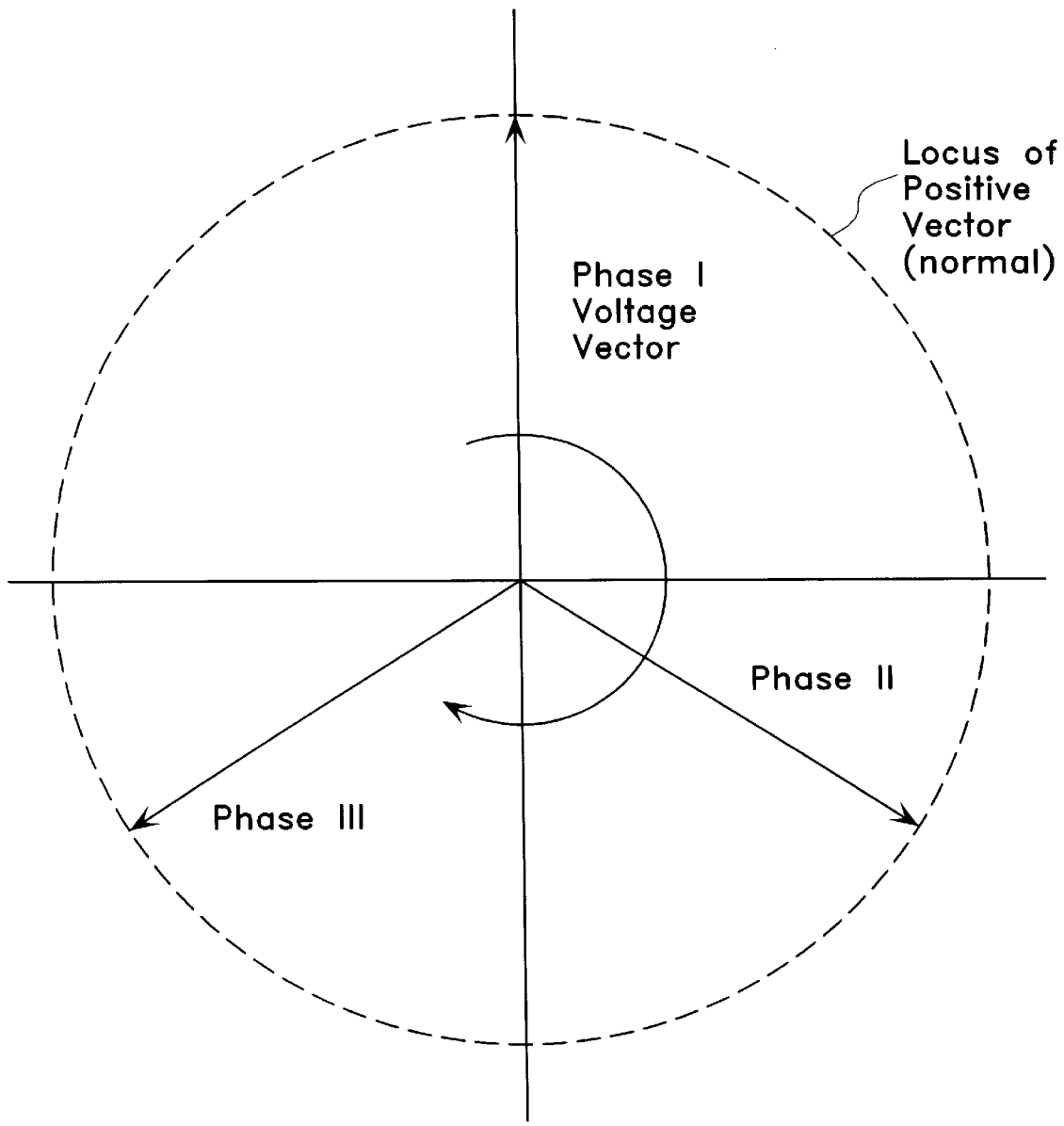
FIG. 9 is a diagram showing a method for activating the control unit in accordance with an aspect of the invention.

Referring to FIG. 9, the power direction and magnitude of the grid voltage describe what can be termed as a locus of a positive voltage vector. The three phases shown are 120° out of phase. However, this aspect of the invention also can be used for single phase or multiphase applications. The radius of the locus of the positive vector of the grid voltage becomes smaller in the event of an undervoltage condition on any phase. Thus, the control unit monitors the shape or change of the locus of the positive vector as a key triggering condition. That is, the locus of the positive vector changes or distorts if only one phase experiences an undervoltage condition. The control unit monitors the change of the locus of the positive vector in accordance with standard power monitoring techniques which are well-known to those skilled in the art and can be implemented without undue experimentation. It is found that monitoring the locus of the positive voltage vector of the grid voltage can eliminate false triggering conditions and can provide an extremely reliable indicator for an undervoltage condition. Also, monitoring the locus of the positive voltage vector has been found to provide an extremely reliable and fast method by which the control unit can activate the switch and instantaneously isolate the load from the grid while simultaneously providing back-up power to load through the SEMS as previously explained.

In accordance with an aspect of the invention, it has been found that the control unit 108 can monitor the shape or change of the locus of the positive vector at sensors 114 to provide an accurate determination as to whether a critical undervoltage condition is occurring on the grid. This has been found to be a key factor in triggering the disconnect from the load and simultaneous connection to the energy storage of the SEMS. Additional factors which are taken into consideration at the site of the sensors 114 are the magnitude of the voltage on the three phase line, and the direction of the power. Thus, the triggering conditions shown in FIG. 5 are based upon the foregoing factors, each being weighted in accordance with standard probabilistic techniques which are well-known. The weighting of these factors can differ based upon power characteristics which are unique to a particular utility grid.

Reconnection

The process for reconnection is also shown with respect to FIGS. 1 and 5. Once the switch 112 has been activated and the load 106 has been completely disconnected from the grid 104, the load is and simultaneously supported by the energy storage of the SEMS, it is necessary to release the switch 112 when the voltage disturbance has passed and to switch the load 106 back on to the grid 104. This process is also accomplished through the control unit 108 which monitors the grid through sensors located at 114.

In accordance with an aspect of the invention, the voltage from the grid must be resynchronized for reconnection with the load 106 such that the reconnection is substantially transient-free. A power control system 108 in FIG. 1 is used to resynchronize the three phase voltage provided by the SEMS to the load 106 with that of the grid 104. The resynchronization is accomplished with a phase locked loop (PLL) which synchronizes the frequency of the voltage from the AC/DC converter 102 and the frequency of the voltage on the grid 104. The PLL is provided in the control unit 108. The control unit 108 is also programmed to command reconnection of the load 106 to the grid 104 once the grid stabilizes or goes back to normal.

The reconnection procedure comprises the following steps:

One or more sensors located at 114 monitor the state of the grid on the phase line 110, and after the voltage recovers and remains stable for a predetermined number of cycles, the control unit 108 determines that the line is back to normal.

The switch 112 is closed. The load 106 is fed from the grid 104 again and the SEMS is simultaneously commanded to stop delivering active power to the load 106.

Prior to closing the switch 112, the control unit, through sensors 114, senses the frequency of each phase of the grid voltage on three phase line 110. The phase locked loop within the control unit 108 is used to reset the frequency of the voltage delivered from the AC/DC converter 102 such that the voltage delivered by the AC/DC converter 102 is synchronized with the three phase voltage at nodes 116. This effectively provides a transient-free reconnection between the grid 104 and load 106.

The above logic can be programmed into control unit 108 in a standard manner which is well known to those skilled in the art and can be implemented readily without undue experimentation. The exact sampling rate, triggering point (fraction of maximum time), and sensitivity and threshold points can be adjusted on a case-by-case basis.

With reference to the aspects of the invention shown in FIG. 1, the protection sequence comprises commanding the power converter (AC/DC converter 102 of FIG. 1) to start drawing energy from the energy storage unit 100 and supply it to the load 106. While simultaneously completely disconnecting the load from the utility grid 104 through switch 112. The control system will continue to support the load until the line voltage becomes normal again (short sag) or until the stored energy is depleted as in the case of a long sag or interruption.

It will be appreciated that there is only one circuit path between the grid 104 and the load 106, as shown in FIG. 1. The same control signal produced by the control unit 108 simultaneously effects a complete disconnect of the load from the grid through switch 112 and activates AC/DC converter to couple the energy stored in the energy storage device 100 into the load. The complete and simultaneous disconnect of the grid from the load upon the transfer of stored energy into the load is such that the energy is provided to the load substantially without interruption. That is, the system uses the complete disconnect from the grid to enable energy to be transferred simultaneously into the load without transient and without the usual delay in providing ramp up power to the load.

Computer Simulation

Figure 6:
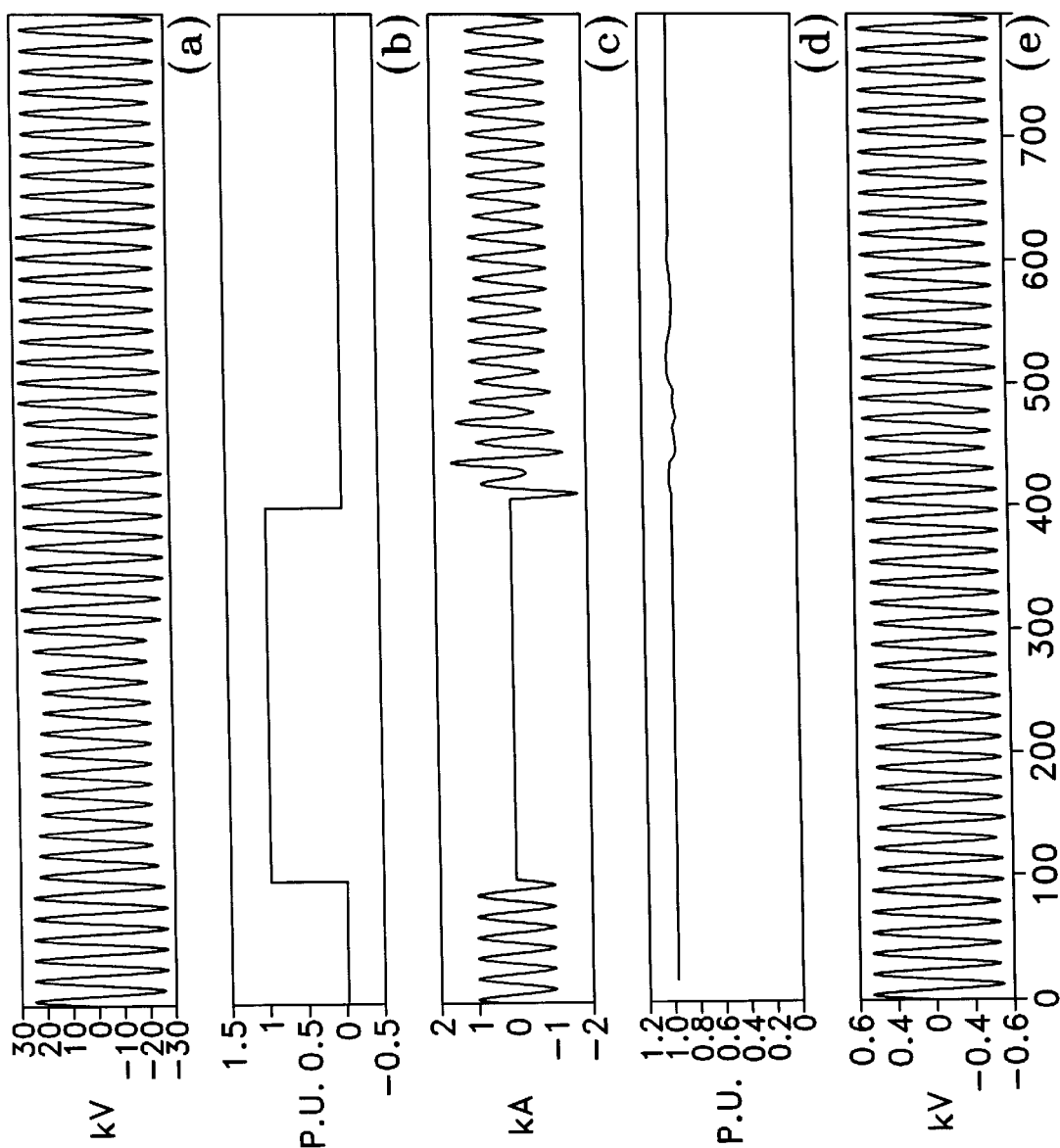
FIG. 6 shows a computer simulation of the control logic of FIG. 5.

FIG. 6 shows a computer simulation of the protection scheme described above with respect to FIG. 5 for the SEMS system shown in FIG. 1. The time scale in FIG. 6 is in milliseconds (ms). The first plot shown at (a) at the top of FIG. 6 shows a voltage sag (80% of nominal) lasting 200 ms.

The second plot shown at (b) in FIG. 6 shows the control signal going from 0 (normal mode) to 1 (emergency mode), and back to 0 once the sag clears and the controller determines that the line is back to normal (100 ms after the end of the sag). The third plot (c) shows the line current.

The fourth plot (d) of FIG. 6 shows the normalized r.m.s. voltage seen by the load. Note that the voltage does not change during the sag but rather provides seamless support during the complete disconnect from the grid. Even if a sag is detected, the control unit opens the switch to the grid and disconnects the grid from the load. This disconnect is seamless and the simultaneous transfer of energy into the load is seamless, without voltage spikes or fluctuations. However, the voltage transient upon reconnection remains within the 95% threshold and its effects are negligible.

The last plot (e) of FIG. 6 is a plot of the current in the load. Note, the current remains essentially constant.

Frequency Distribution of Voltage Sags

Figure 7:
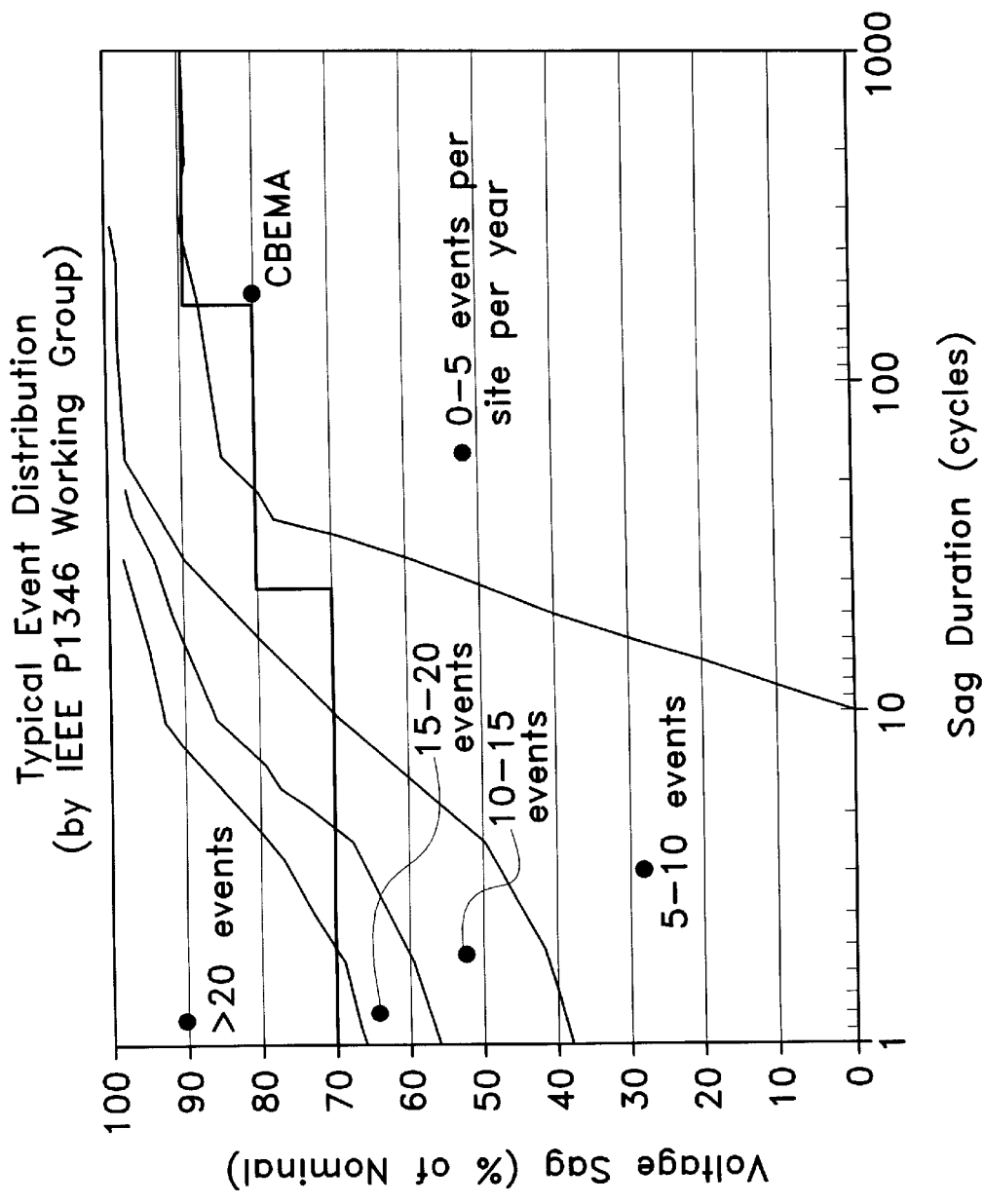
FIG. 7 is a diagram showing the frequency distribution of voltage sags for a typical industrial site.

FIG. 7 is a diagram showing the frequency distribution of voltage sags for a typical industrial site in the United States. Each region in the diagram has a different frequency of occurrence associated with it. For instance, the region to the right of the right-most curve represents long and deep sags. Such sags are rare; their occurrence ranges from none to 5 per year. The next region to the left represents sags of moderate depth and moderate duration. These moderate sags are more frequent (5 to 10 per year in a typical site). Superimposed on this diagram is one example of a curve defining a practical undervoltage limit. In this case the practical undervoltage limit is shown by the so-called CBEMA curve, a common standard for power quality. Industrial equipment is intended to survive voltage sag events as long as they are above the CBEMA curve. For example, semiconductor processing equipment should be capable of riding through a 70% sag as long as it is shorter than 11 cycles. The longer the sag, the shallower it needs to be in order to be tolerable.

Load Coverage

Figure 8:
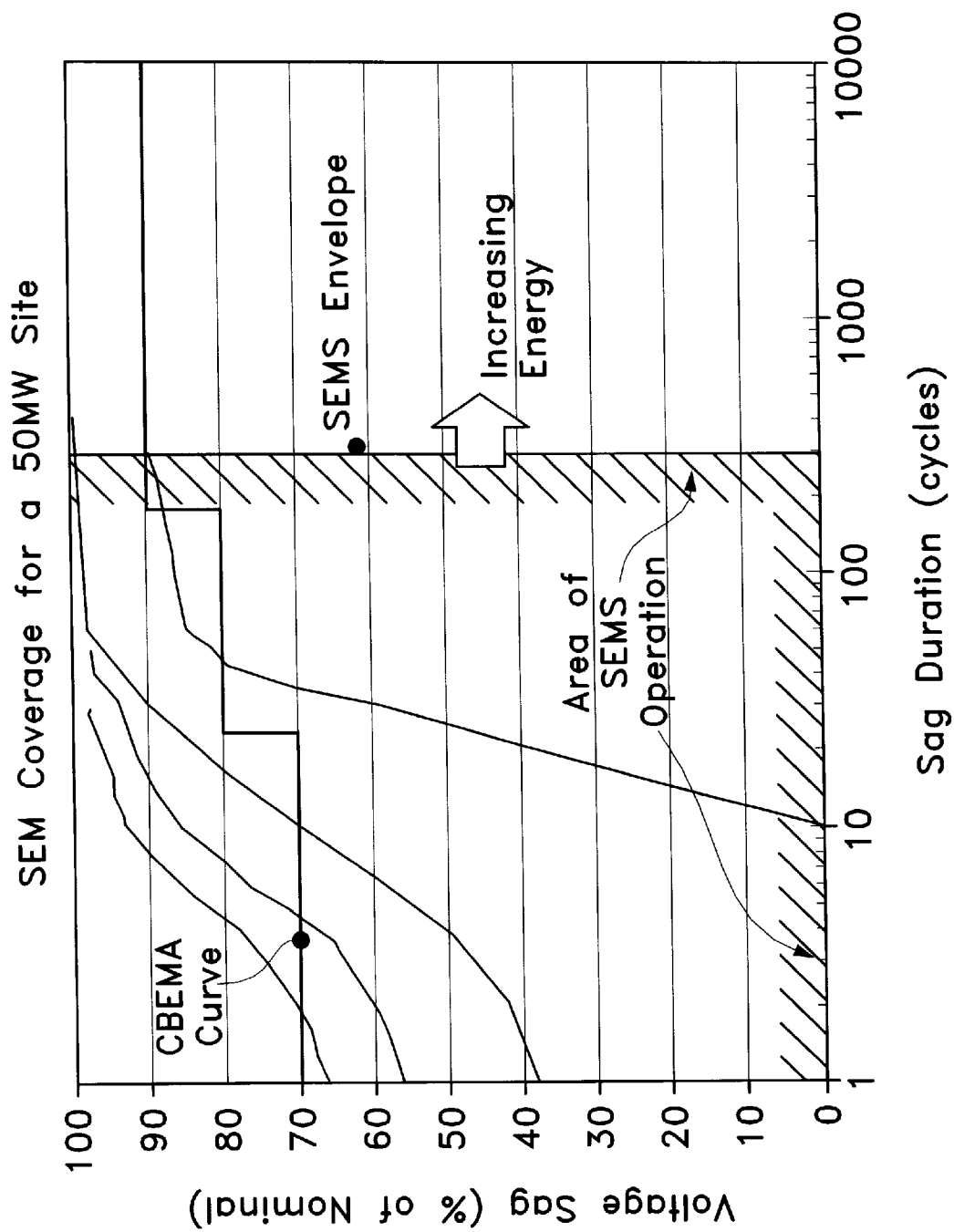
FIG. 8 is a diagram showing the operational range that can be protected by SEMS in accordance with an aspect of the invention.

FIG. 8 is a diagram showing the area that the present SEMS can cover. The plant is protected against sags of any depth and duration up to the capacity of the energy storage unit. Because the system is shunt connected, once a voltage sag occurs, the SEMS will transfer power to the entire load and support it to the extent possible with all of the stored energy available. Longer coverage is made possible by increasing the size of the energy storage unit. As previously explained, this is achievable through the modular construction of the energy storage device.

In another aspect, the present invention has the capability of providing a complete bridge to an alternative source of electric power in the event of a long term power outage. Since the load is completely switched off from the grid when a power outage occurs, an aspect of the present invention can support the load long enough to provide a transient free bridge to back up electric power when the power outage on the grid does not go away immediately. For example, the control logic unit 108 monitors the grid at sensor 114 continuously during the power outage. If the power outage does not dissipate within a predetermined time frame, control logic unit 108 commands an alternate electric power supply to start and be coupled to the load such that the load can ride through a long term voltage outage. The present SEMS can be used with a backup source of electric power such as a diesel powered generator, gas turbine powered generator or other source of electric power. It is important to note that the source of electric power is provided on a three phase line to the load. The logic control unit 108 uses the previously described phase locked loop procedure to synchronize each phase of the voltage from the backup power generator such that the transfer of power to the load from the superconducting magnet over to the backup generator is also essentially transient free.

Scope

While the invention has been described in connection with what is presently considered to be the most practical and preferred embodiments, it is to be understood that the invention is not limited to the disclosed embodiments, but on the contrary it is intended to cover various modifications and equivalent arrangements included within the spirit and scope of the appended claims. For example, the selection and prioritizing of a plurality of loads may be accomplished be other equivalent configurations which are well known to those skilled in the art. Such equivalent configurations may comprise real time monitoring of the loads, their power requirements and power to the loads by many power monitoring techniques which are well-known to those skilled in the art. However, in such a configuration, the present invention still provides the advantage of a complete disconnect from the grid and simultaneous transient free transfer of energy into one or more loads.

Also, it is readily understood by one skilled in the art that the connections shown in the drawings and the embodiments described herein may be applicable to single phase, three phase or multiphase applications.

Therefore, persons of ordinary skill in this field are to understand that all such equivalent arrangements and modifications are to be included within the scope of the following claims.

What is claimed is:

1. A shunt connected energy storage and back up system for supporting one or more loads receiving power from a utility grid for connecting a source of electric power to said one or more loads; said energy storage and back up system comprising:

a control monitoring system coupled to the utility grid for providing a control signal indicative of an interruption or undervoltage condition on the utility grid and for sensing stabilization of the utility grid;

an energy storage device for providing active power in a range of 2 MW to 200 MW and stored energy in a range from 25 megajoules to 1,000 megajoules to a load for a duration commensurate with the storage capacity of said energy storage device;

a single switchable connection between the energy back up and storage system and said one or more loads, said single switchable connection responsive to the control signal for simultaneously both isolating the load and energy storage and backup system from the utility grid and for enabling the energy storage device to provide active power to the load;

a power converter unit responsive to the control signal indicative of the undervoltage or interrupt condition for coupling the energy storage device to the one or more loads such that upon activation of the single switchable connection, the disconnect from the utility grid is transient-free and the reconnect to the grid after stabilization is transient-free.

2. An energy storage system for protecting one or more power sensitive loads connected over a utility grid to a source of electric power comprising:

an energy storage system connected to said one or more loads for protecting said one or more power sensitive loads from an undervoltage condition or power interruption on the utility grid, said energy storage system further comprising:

a control circuit coupled to the utility grid for sensing an undervoltage condition or interruption on the utility grid and for providing an output signal representative of said undervoltage condition;

a switch responsive to said output signal for simultaneously isolating the load and energy storage system from the utility grid, and for simultaneously enabling the energy storage system to provide back up power to said one or more power sensitive loads upon activation by said output signal;

a power converter unit providing an energy flow in a range from 2 MWs to 200 MWs to said one or more power sensitive loads and for providing substantially transient-free, instantaneous ramp-up of power to said one or more power sensitive loads when the switch disconnects said one or more power sensitive loads from the utility grid.

3. A device as in claim 2 wherein said one or more power sensitive loads comprises a plurality of loads and further comprising:

a control system coupled with said control circuit for actively monitoring the energy need of each load of said plurality of loads and for providing a priority ordering of said plurality of loads for coupling with said energy storage system such that active power from said energy storage system is provided in accordance with the energy need of each of said plurality of loads when an undervoltage condition is detected;

a microprocessor including a system for monitoring real time information on power operating parameters for each of said plurality of loads and;

means for comparing the real time operating parameters of each of said plurality of loads to corresponding optimized operating parameters stored in a memory coupled to said microprocessor and for producing an output signal representative of a priority ranking of the power need of each of said plurality of loads over a given time interval;

a load selector circuit having an input lead connected to the converter unit, a plurality of output leads each connected to a corresponding load of said plurality of loads and a control lead for receiving said signal representative of a priority ranking of power needs, said load selector selectively switching back up power from said converter unit into selected loads from said plurality of loads as a function of power need.

4. A modular energy storage system for providing scalable back-up power to one or more loads connected to a utility grid comprising:

a plurality of superconducting magnets, each superconducting magnet being linkable to another superconducting magnet in a modular arrangement for providing a scalable source of stored energy for back-up power to at least one of said one or more loads in the event of an undervoltage condition, interruption or other power discontinuity on a utility grid;

a control circuit for monitoring the utility grid and for providing a control signal indicative of said undervoltage condition, interruption or other power discontinuity;

one or more power converter units linkable in a modular arrangement for connecting the scalable store of energy from said superconducting magnets to said at least one of said one or more loads upon activation by said control signal;

a switch providing a single switchable connection between said at least one of said one or more loads and said utility grid, said switch simultaneously isolating said at least one of said one or more loads and energy storage system from the grid and simultaneously enabling said power converter units to couple the stored energy into said at least one of said one or more loads upon activation by the control signal.

5. A modular energy storage system for providing scalable back-up power to at least one of one or more loads connected to a utility grid comprising:

a plurality of superconducting magnet modules, each module comprising one or more superconducting magnets connected together such that the energy storage of the plurality of modular superconducting magnets is scalable without changing the size of the module;

a converter unit comprising a plurality of prefabricated, modular AC/DC converters, each connected for receiving the energy from one or more modular superconducting magnets, and each AC/DC converter connectable in parallel with an associated one or more AC/DC converters for current sharing to provide a scalable source of active power to said at least one of said one or more loads upon activation by a control signal;

a control monitoring system comprising a switch responsive to a control signal for simultaneously isolating said at least one of said one or more loads and energy storage system from the utility grid and for simultaneously enabling the converter unit to couple power into said at least one or more loads, said control monitoring system further comprising;

a sensor connected for monitoring the utility grid for detecting an under-voltage condition and for providing a control signal representative of that condition such that a control signal activates the switch to disconnect said at least one of said one or more loads from the utility grid and simultaneously enable the AC/DC converter to send energy to said at least one of said one or more loads such that the energy transfer from the energy storage system to said at least one of said one or more loads is transient-free and said sensor monitors the grid for reconnection when grid operation is normal.

6. An energy storage system for delivering back-up power to a load connected to a utility grid comprising:

energy storage comprising a plurality of prefabricated, containerized superconducting magnets interconnected such that the plurality of superconducting magnets provide a scalable store of energy for delivery to the load;

a converter unit for connecting the energy storage to the load, said converter unit comprising a plurality of prefabricated and containerized converters interconnected for receiving the output energy of said superconducting magnets and for coupling said energy as active power to the load upon receipt of a control signal;

a switch responsive to a control signal representative of an undervoltage condition on the grid such that activation of the switch isolates the grid from the load and simultaneously enables the converter unit to couple energy into the load such that the transfer of energy to the load is substantially transient-free.

7. A method for isolating a load from a utility grid during a voltage sag or interruption on the grid, and for simultaneously enabling energy stored in a SEMS to support the load, the method comprising the steps of:

activating a single switch for simultaneously isolating the load and SEMS from the utility grid and for simultaneously coupling power to the load from the SEMS;

sampling the line voltage on the utility grid at a sufficiently high rate to achieve a decision and activate said switch within ½ cycle;

comparing the sampled line voltage to a reference voltage (100%) and computing the resulting fraction;

defining a threshold for activating said switch in terms of the magnitude of the sag and its duration, or the duration of the interruption, in seconds such that when the product of the computed fractional voltage computed multiplied by the time elapsed from the first detection of the voltage sag, is greater than the threshold, the switch is activated to disconnect the load from the grid and simultaneously enable the energy storage system to release the stored energy into the load.

8. A method for isolating a load from a utility grid during a voltage sag/interruption and for simultaneously switching the load to a backup source of energy comprising the steps of:

sampling line voltage and load current on at least one phase of one or more phases;

comparing the sampled line voltage to a reference voltage and computing the resulting fraction;

computing one or more parameters of the sampled voltage and current, such as step-in-phase angle, power flow direction, and space vector locus;

defining a threshold time for activation of the switch in terms of the computed fraction of the reference voltage such that when an elapsed time from the beginning of the voltage sag is greater than the threshold, computed for the instantaneous magnitude of the sag the switch is activated to disconnect the load from the grid and simultaneously transfer the back up energy into the load.

9. A method as in claim 8 wherein the sampling of line voltage and load current on the grid is done at a sufficiently high sample rate to achieve a decision to isolate the load within one-half cycle.

10. A method as in claim 8 wherein the step of defining the threshold time for activation of the switch further comprises the step of monitoring and acting upon one or more characteristics of AC power on the grid such as the direction of power flow, step-in phase angle and locus of positive vector.

11. A modular energy storage system for providing scalable back-up power to one or more loads connected to a utility grid comprising:

a plurality of superconducting magnets, each superconducting magnet being linkable to another superconducting magnet in a modular arrangement for providing a scalable source of stored energy for back-up power to at least one of said one or more loads in the event of an undervoltage condition, interruption or other power discontinuity on a utility grid;

a control circuit for monitoring the utility grid and for providing a control signal indicative of said undervoltage condition, interruption or other power discontinuity;

one or more power converter units linkable in a modular arrangement for connecting the scalable store of energy from said superconducting magnets to said at least one of said one or more loads upon activation by said control signal;

a switch providing a single switchable connection between said at least one of said one or more loads and said utility grid, said switch simultaneously isolating said at least one of said one or more loads and energy storage system from the grid and simultaneously enabling said power converter units to couple the stored energy into said at least one of said one or more loads upon activation by the control signal, a plurality of superconducting magnet modules, each module comprising one or more superconducting magnets connected together such that the energy storage of the plurality of modular superconducting magnets is scalable without changing the size of the module;

a converter unit comprising a plurality of prefabricated, modular AC/DC converters, each connected for receiving the energy from one or more modular superconducting magnets, and each AC/DC converter connectable in parallel with an associated one or more AC/DC converters for current sharing to provide a scalable source of active power to said at least one of said one or more loads upon activation by a control signal;

a control monitoring system comprising a switch responsive to a control signal for simultaneously isolating said at least one of said one or more loads and energy storage system from the utility grid and for simultaneously enabling the converter unit to couple power into said at least one or more loads, said control monitoring system further comprising;

a sensor connected for monitoring the utility grid for detecting an under-voltage condition and for providing a control signal representative of that condition such that a control signal activates the switch to disconnect said at least one of said one or more loads from the utility grid and simultaneously enable the AC/DC converter to send energy to said at least one of said one or more loads such that the energy transfer from the energy storage system to said at least one of said one or more loads is transient-free and said sensor monitors the grid for reconnection when grid operation is normal.

* * * * *